United States Patent
Feldman et al.

(10) Patent No.: US 10,145,503 B2
(45) Date of Patent: Dec. 4, 2018

(54) WALL MOUNT FOR FLAT AND NON-FLAT SCREENS

(71) Applicant: BARKAN MOUNTS LTD, Tel Aviv (IL)

(72) Inventors: Peter Feldman, Ariel (IL); David Moskovich, Herzelia (IL)

(73) Assignee: BARKAN MOUNTS LTD, Tel Aviv (IL)

( * ) Notice: Subject to any disclaimer, the term of this patent is extended or adjusted under 35 U.S.C. 154(b) by 0 days.

(21) Appl. No.: 14/730,254

(22) Filed: Jun. 4, 2015

(65) Prior Publication Data

US 2016/0353885 A1   Dec. 8, 2016

(51) Int. Cl.
*A47B 97/00* (2006.01)
*F16M 11/00* (2006.01)

(52) U.S. Cl.
CPC ............. *F16M 11/00* (2013.01); *A47B 97/00* (2013.01); *A47B 97/001* (2013.01)

(58) Field of Classification Search
CPC ...... A47B 81/065; A47B 97/001; A47B 97/00
USPC .......... 248/277.1, 917, 919–924, 121, 122.1, 248/274.1, 282.1, 284.1, 288.11, 124.1, 248/159, 188.1; 361/679.21, 679.01, 361/679.02, 679.06, 679.07, 679.22
See application file for complete search history.

(56) References Cited

U.S. PATENT DOCUMENTS

| | | | | |
|---|---|---|---|---|
| 805,074 A * | 11/1905 | Kemp | .................. | A47C 3/26 108/141 |
| 4,750,832 A | 1/1988 | Lloyd, Sr. et al. | | |
| 5,398,901 A * | 3/1995 | Brodmann | .............. | A47B 81/06 248/181.1 |
| 6,343,006 B1 * | 1/2002 | Moscovitch | ............ | B60R 11/02 348/794 |
| 6,863,252 B2 * | 3/2005 | Bosson | .................. | F16M 11/04 248/131 |
| 7,252,272 B2 * | 8/2007 | Hsiung | ................... | B60R 11/02 248/278.1 |
| 7,316,377 B2 | 1/2008 | Smed | | |
| 7,380,760 B2 * | 6/2008 | Dittmer | .................. | F16M 11/02 248/278.1 |
| 7,513,474 B2 * | 4/2009 | Anderson | .............. | F16M 11/10 248/284.1 |
| 7,832,700 B2 * | 11/2010 | Ciungan | ................ | F16M 11/04 248/281.11 |

(Continued)

FOREIGN PATENT DOCUMENTS

CN           203948899        11/2014

*Primary Examiner* — Nkeisha Smith
(74) *Attorney, Agent, or Firm* — Soroker Agmon Nordman

(57) ABSTRACT

A wall mounting system for connecting a back of a flat or curved screen to a wall, including, a mounting interface having semi-spherical depressions, multiple elongated beams having matching, semi-spherical depressions for adjustably coupling with the semi-spherical depressions of the mounting interface, wherein the semi-spherical depressions of the elongated beams and the mounting interface have holes for non-movably coupling between them once adjusted, wherein each elongated beam has one or more cut out portions for attaching the elongated beam to the back of the screen: and wherein the mounting interface serves as an interface for holding the screen while it is attached to the wall by the mounting system.

14 Claims, 7 Drawing Sheets

(56) References Cited

U.S. PATENT DOCUMENTS

| | | | |
|---|---|---|---|
| 7,905,460 B2* | 3/2011 | Woods | F16M 11/04 |
| | | | 248/220.21 |
| 7,997,550 B2 | 8/2011 | Kuhn | |
| 8,864,089 B2* | 10/2014 | Hung | F16M 11/041 |
| | | | 248/122.1 |
| 9,038,971 B1* | 5/2015 | Guthrie | F16M 13/022 |
| | | | 248/121 |
| 9,267,641 B2* | 2/2016 | Gillespie-Brown | B60R 11/00 |
| 2005/0087661 A1 | 4/2005 | Rabenius | |
| 2005/0139742 A1* | 6/2005 | Frisell | F16M 11/04 |
| | | | 248/317 |
| 2010/0237210 A1* | 9/2010 | Anderson | F16M 11/04 |
| | | | 248/274.1 |

\* cited by examiner

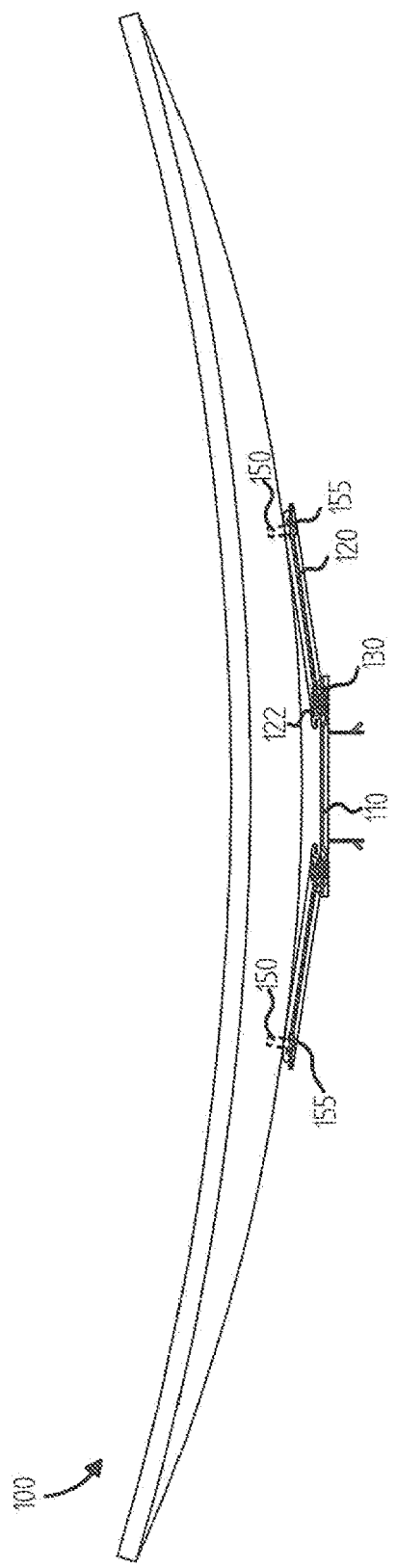

WALL MOUNT FOR FLAT AND NON-FLAT SCREENS

TECHNICAL FIELD

The present invention relates to await mount arm for holding television or computer screens and more particularly wherein the screen can be a non-flat screen.

BACKGROUND

In recent years the classic cathode ray tube (CRT) computer and television screens have generally been replaced by thin screens based on liquid crystal display (LCD) or light emitting diode (LED) technology. Additionally the standard available screen size has increased. Instead of a maximum size of 32" or less a person can purchase television screens with a screen size of 40", 50" or even 80"-90".

The newer screens are much lighter than the older CRT screens and can conveniently be hung from a wall with a mechanism having an arm and a mounting interface at the screen end designed to fit standard screw holes on the back of the screen.

The Video Electronics Standard Association (VESA) defined a family of standards know as the Flat Display Mounting Interface (FDMI) or VESA Mounting Interface Standard (MIS) defining the mounting interface size and distances between the screw holes on the mounting interface and on the back of the screen as a function of the screen size (diagonal) and weight.

Recently curved screens (e.g. concave screens) have been introduced and they are gaining popularity since many viewers feel that they provide an enhanced viewing experience. One problem with curved screens is that the screw holes are shifted so standard wall mount interfaces don't fit. Thus a consumer is limited to using more expensive dedicated mounting interfaces or to add non-standard inserts, spacers or special screws for attaching a standard mounting interface. In many cases non-standard additions can result in an unstable wall mount. Accordingly a solution that fits flat screens and non-flat screens is thus desirable.

SUMMARY

An aspect of an embodiment of the disclosure relates to a system and method for mounting a flat or curved screen to a wall. The mounting is performed using a mounting interface that is attached on one side to the back of the screen and on the other side to the rest of the mounting system. The mounting interface can be a polygonal mounting interface having semi-spherical depressions near the vertices or it may have any other shape with depressions near the edges. Additionally, the interface has multiple elongated beams with matching semi-spherical depressions to be coupled to the mounting interface in a ball and socket manner. The elongated beams can be tilted up and down (out the plane of the mounting interface) and/or moved right or left (in the plane of the interface) while the matching semi-spherical depressions are in contact with each other. During installation the elongated beams are adjusted so that cut out portions on the elongated beams enable the elongated beams to be attached to the back of the screen, for example by inserting a screw through the cut out portion into a screw socket on the back of the screen. Once the elongated beams are adjusted the matching semi-spherical depressions are locked together so that the mounting interface forms a rigid unit with the elongated beams and can be easily attached to the back of the screen.

In some embodiments of the disclosure, the depressions can be located anywhere on the mounting interface and not specifically near the edges. Optionally, more than one elongated beam can be places within a single depression on the mounting interface.

Optionally, the matching semi-spherical depressions are locked together using a screw and nut. The nut may be spherical or semi-spherical to fit better into the depressions. In an exemplary embodiment of the disclosure, the semi-spherical depression on the elongated beam is placed inside the semi-spherical depression of the mounting interface. Alternatively, the semi-spherical depression on the elongated beam is placed outside the semi-spherical depression of the mounting interface. Optionally, both of the semi-spherical depressions have a hole for inserting a screw and nut to lock them together and prevent them from moving once they are adjusted as needed. In an exemplary embodiment of the disclosure, the hole on the elongated beam is larger than the hole on the mounting interface or vice versa to enhance the ability to adjust the position of the elongated beam relative to the mounting interface.

There is thus provided according to an exemplary embodiment of the disclosure, a wall mounting system for connecting a back of a flat or curved screen to a wall, comprising:

A mounting interface having semi-spherical depressions;

Multiple elongated beams having matching semi-spherical depressions for adjustably coupling with the semi-spherical depressions of the mounting interface; wherein the semi-spherical depressions of the elongated beams and the mounting interface have holes for non-movably coupling between them once adjusted;

Wherein each elongated beam has one or more cut out portions for attaching the elongated beam to the back of the screen; and Wherein the mounting interface serves as an interface for holding the screen while it is attached to the wall by the mounting system.

In an exemplary embodiment of the disclosure, the mounting interface has a polygonal shape. Optionally, the semi spherical depressions of the mounting interface are located near the vertices of the polygonal shape. In an exemplary embodiment of the disclosure, the mounting interface is shaped as a square or rectangular. Optionally, the mounting interface includes a central part and extensions that are detachable from the central part; wherein the semi-spherical depressions are located on the extensions. In an exemplary embodiment of the disclosure, the hole in the semi-spherical depression on the elongated beam is larger or smaller than the hole in the semi spherical depression of the mounting interface to enable positioning the elongated beam to fit a curved screen. Optionally, the semi-spherical depression on the elongated beam is coupled to the semi-spherical depression of the mounting interface using a screw and nut. In an exemplary embodiment of the disclosure, the elongated beam is attached to the screen by inserting a screw through the cut out portion into a screw socket on the back of the screen. Optionally, the mounting interface is attached to the wall with a tilting mechanism to enable the screen to tilt up and down. In an exemplary embodiment of the disclosure, the mounting interface is attached to the wall with multiple stages that are pivotally connected.

There is further provided according to an exemplary embodiment of the disclosure, a method of connecting a back of a flat or curved screen to a wall with a mounting system, comprising:

Providing a mounting interface having semi-spherical depressions;

Placing multiple elongated beams having matching semi-spherical depressions into the semi-spherical depressions of the mounting interface;

Adjusting the elongated beam relative to the screen and the mounting interface;

Coupling between the semi-spherical depressions of the elongated beams and the semi-spherical depressions of the mounting interface by a hole in the semi-spherical depressions of the elongated beams and a hole in the semi-spherical depressions of the mounting interface;

Attaching between a cut out portion on each of the elongated beams with the back of the screen; and Connecting the mounting interface to the wall.

In an exemplary embodiment of the disclosure, the mounting interface has a polygonal shape. Optionally, the semi spherical depressions of the mounting interface are located near the vertices of the polygonal shape. In an exemplary embodiment of the disclosure, the mounting interface is shaped as a square or rectangular. Optionally, the mounting interface includes a central part and extensions that are detachable from the central part; wherein the semi-spherical depressions are located on the extensions. In an exemplary embodiment of the disclosure, the hole m the semi-spherical depression on the elongated beam is larger or smaller than the hole in the semi spherical depression of the mounting interface to enable positioning the elongated beam to fit a curved screen. Optionally, the semi-spherical depression on the elongated beam is coupled to the semi-spherical depression of the mounting interface using a screw and nut. In an exemplary embodiment of the disclosure, the elongated beam is attached to the screen by inserting a screw through the cut out portion into a screw socket on the back of the screen. Optionally, the mounting interface is attached to the wall with a tilting mechanism to enable the screen to tilt up and down. In an exemplary embodiment of the disclosure, the mounting interface is attached to the wall with multiple stages that are pivotally connected.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear. It should be noted that the elements or parts in the figures are not necessarily shown to scale and element or part may be relatively larger or smaller than actually shown.

FIG. 1B is a schematic illustration of a top view of a curved screen with a mounting interface, according to an exemplary embodiment of the disclosure;

DETAILED DESCRIPTION

Figure 1A:
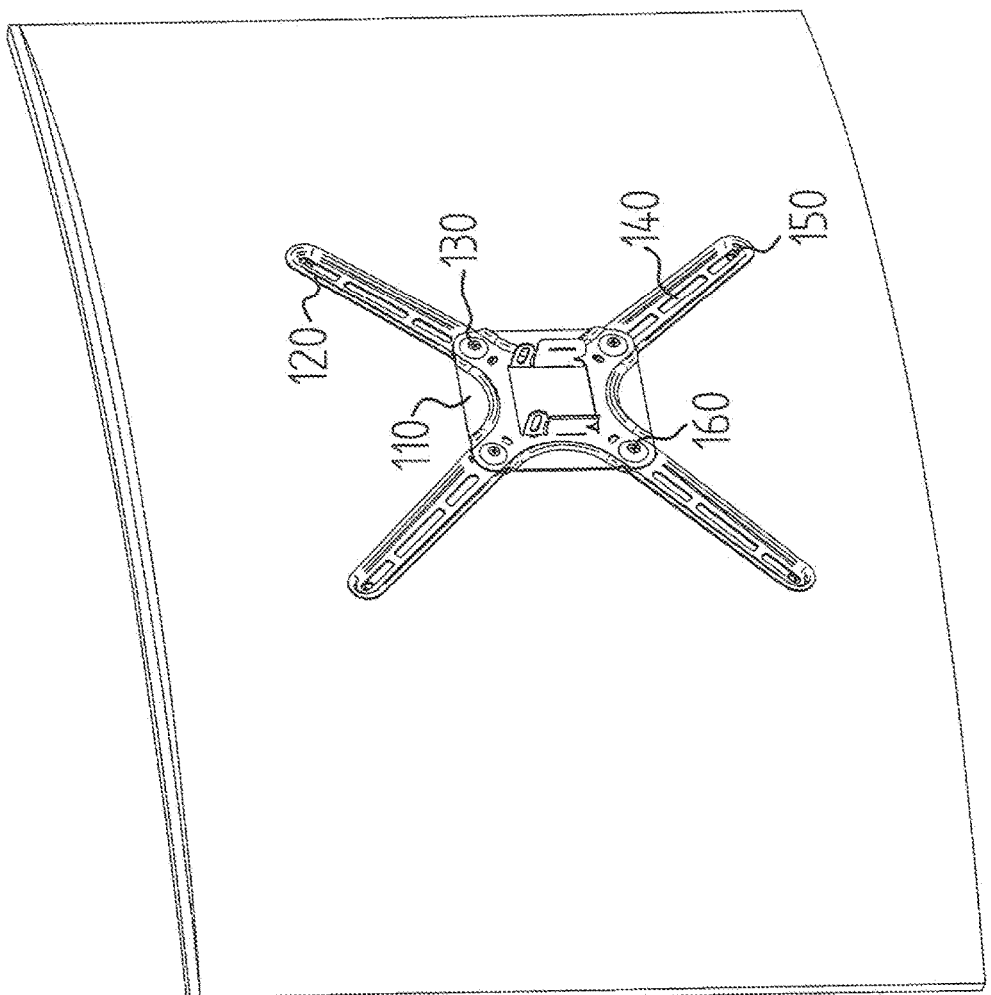
FIG. 1A is a schematic illustration of aback view of a curved screen with a mounting interface, according to an exemplary embodiment of the disclosure.
Figure 2:
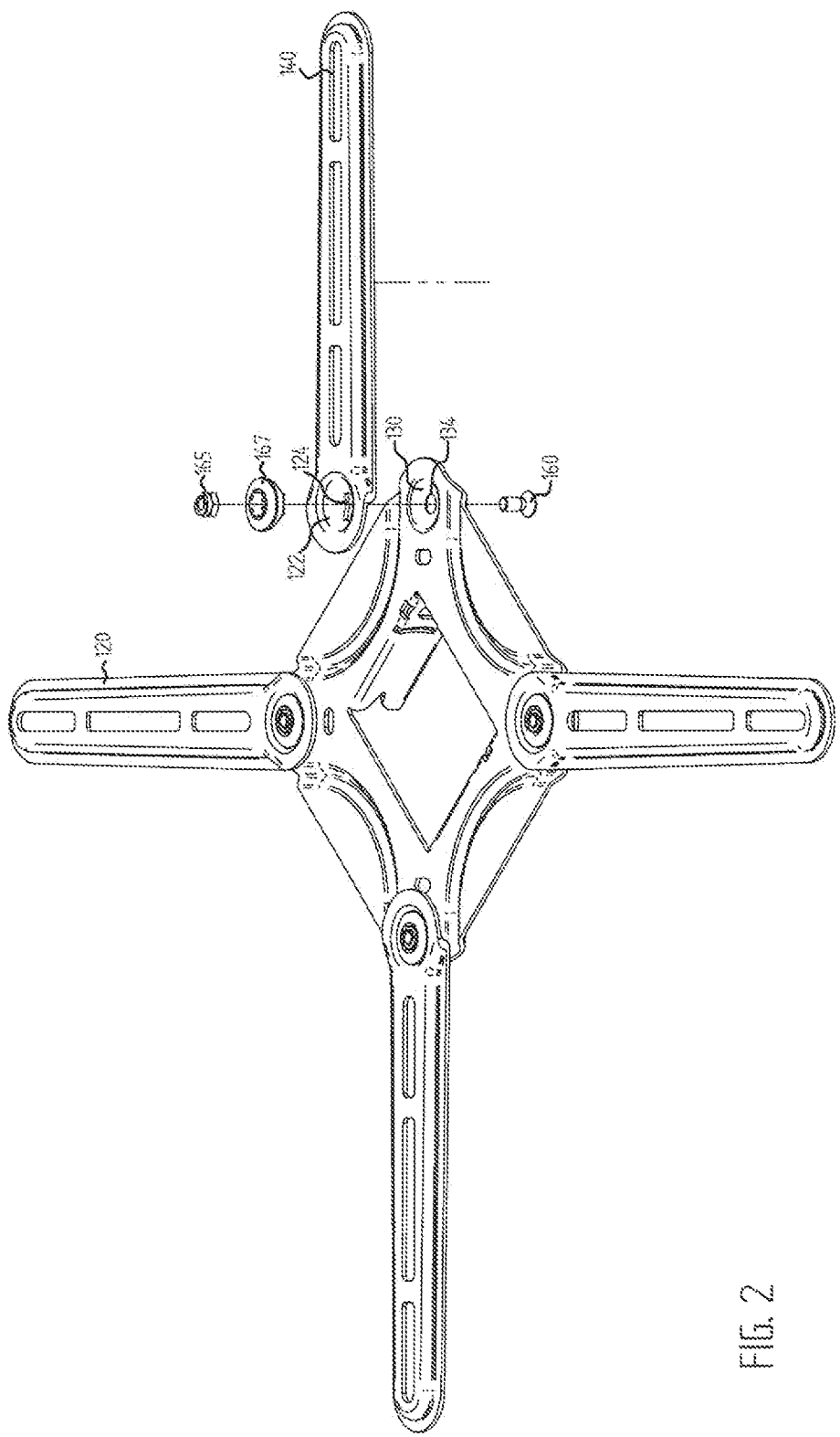
FIG. 2 is a schematic illustration of an exploded perspective view of a mounting interface and elongated beams for attaching to a curved screen, according to an exemplary embodiment of the disclosure.

FIG. 1A is a schematic illustration of a back view of a curved screen 100 with a mounting interface 110, and FIG. 1B is a schematic illustration of a top view of a curved screen 100 with a mounting interface 110, according to an exemplary embodiment of the disclosure. In an exemplary embodiment of the disclosure, mounting interface 110 is shaped as a polygon (e.g. a triangle, a square as in FIG. 1, or rectangle, a pentagon, hexagon or other polygon). The mounting interface 110 is provided with semi-spherical depressions 130 near the vertices of the mounting interface 110 (e.g. near the four corners of a rectangular or square mounting interface 110). Optionally, an elongated beam 120 is provided for each vertex, wherein the elongated beam 120 has a matching semi-spherical depression 122 for coupling with the mounting interface 110. FIG. 2 is a schematic illustration of an exploded perspective view of mounting interface 110 and elongated beams 120 for attaching to a curved screen.

In some embodiments of the disclosure, the mounting interface 110 can have any shape and the depressions 130 may be positioned anywhere on the surface of the mounting interface 110.

In an exemplary embodiment of the disclosure, the semi spherical depressions 122 of the elongated beams 120 are positioned inside the semi spherical depressions 130 of the mounting interface 110 and they are coupled together after adjusting the elongated beams 120 so that cut out portions 140 on the elongated beams 120 match screw sockets 150 on the back of the screen 100 (see FIG. 1A). Alternatively, the semi spherical depressions 122 of the elongated beams 120 are positioned outside the semi-spherical depressions 130 of the mounting interface 110.

The elongated beams 120 can be rotated right or left in the plane of the mounting interface 110 or up or down relative to mounting interface 110 (e.g. out of the plane of mounting interface 110). Then once the elongated beams 120 are positioned to match the screw sockets 150 on the back of the screen 100, the elongated beams 120 and the mounting interface 110 are locked together, for example using a screw 160 and nut 165 or other locking means (e.g. a dowel pin). Optionally, semi-spherical depression 122 includes an enlarged screw hole 124 (larger than a screw hole 134 of the semi-spherical depressions on the mounting, interface 110) to allow the elongated beam 120 to be adjusted freely relative to the mounting interface 110. Alternatively the screw hole 134 of the semi-spherical depressions 130 on the mounting interface 110 may be larger. In an exemplary embodiment of the disclosure, the nut 165 is also shaped to be semi-spherical or spherical to enhance locking the mounting interface 110 to the elongated beam 120. In some embodiments of the disclosure, nut 165 may be a standard circular nut or standard hexagonal nut. Optionally, the nut 165 is enclosed in a housing 167 (e.g. a plastic housing) providing it with a spherical shape so that it will fit better into semi-spherical depression 122 and/or semi-spherical depression 130 to prevent movement once the elongated beams 120 are positioned correctly.

In an exemplary embodiment of the disclosure, the mounting interface 110 with the elongated beams 120 locked to it is attached to the back of screen 100 with locking screws 155. Optionally, the mounting interface 110 and the elongated beams 120 are made from rigid materials, for example metals such as aluminum or steel. In some embodiments of the disclosure, rigid plastic materials are used depending on the strength of the material and the weight of the screen. In some embodiments of the disclosure, the mounting interface 110 with elongated beams 120 can be used also for standard flat screens by adjusting the elongated beams 120 and not only for curved screens (e.g. concave screens).

Figure 3:
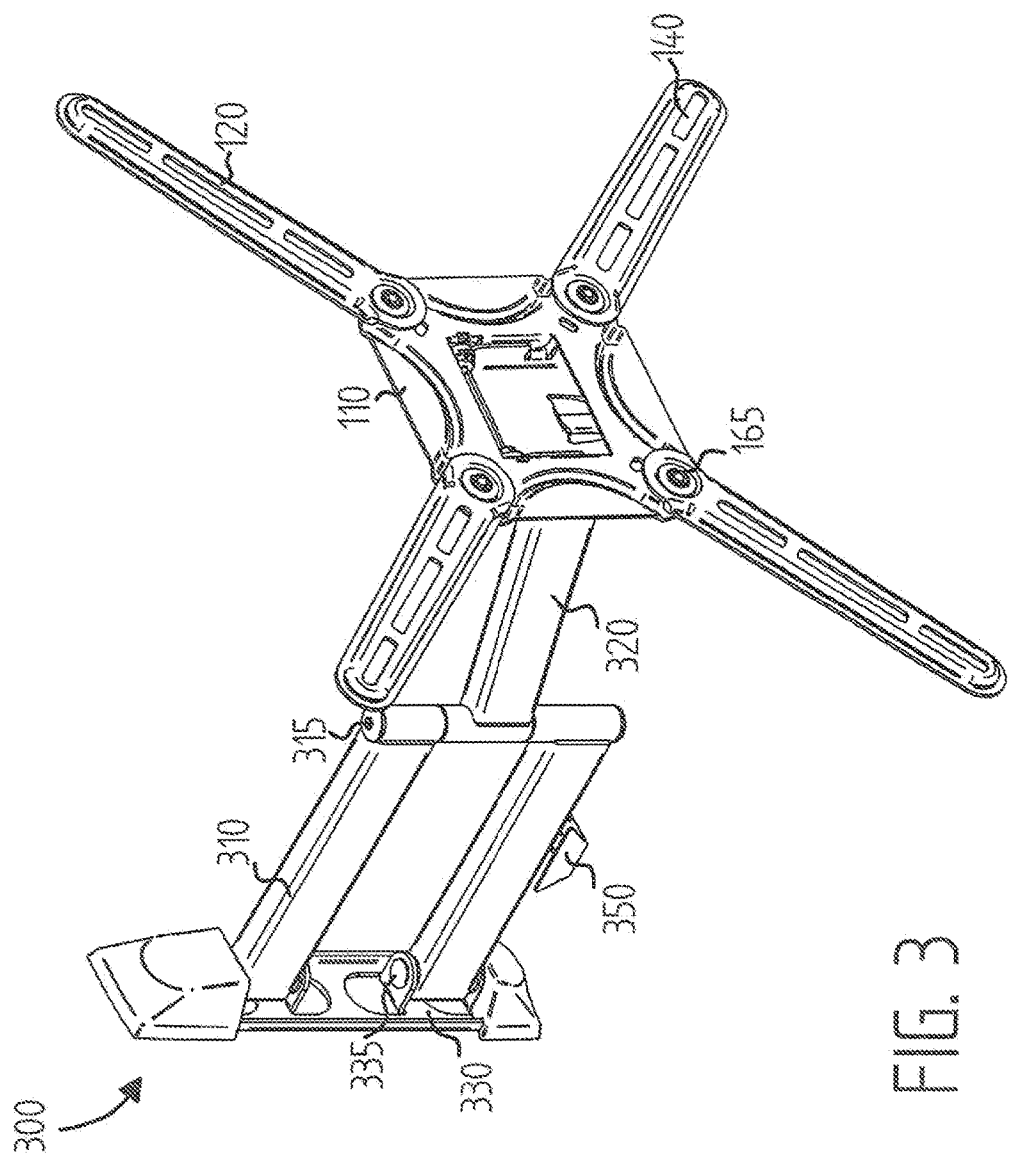
FIG. 3 is a schematic illustration of a front view of a wall mount system, according to an exemplary embodiment of the disclosure.
Figure 4:
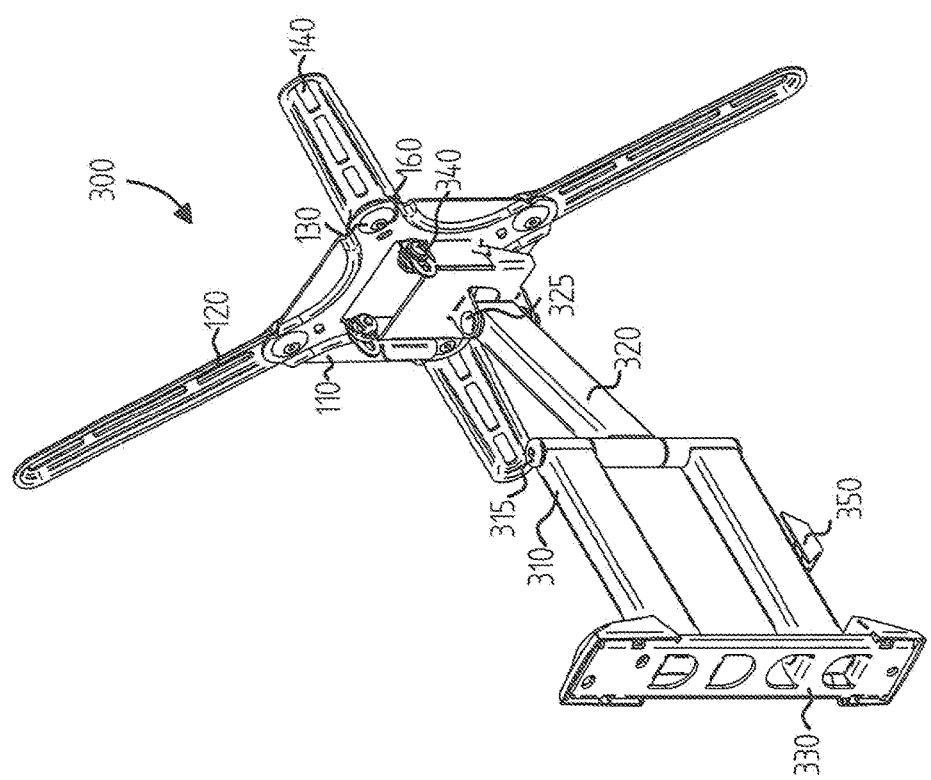
FIG. 4 is a schematic illustration of a back view of a wall mount system, according to an exemplary embodiment of the disclosure.

FIG. 3 is a schematic illustration of front view of a wall mount system 300, and FIG. 4 is a schematic illustration of a back view of a wall mount system 300, according to an exemplary embodiment of the disclosure. In an exemplary embodiment of the disclosure, wall mount system 300 includes mounting interface 110 with elongated beams 120 for mounting flat screens or curved screens on the wall. Optionally, wall mount system 300 includes a bracket 330 for attaching wall mount system 300 to the wall. Additionally, wall mount system 300 may include one or more extension arms, for example extension arms 310 and/or 320. Optionally, extension arm 310 may be attached with a pivot 335 relative to bracket 330 to allow the screen to swivel relative to the wall. In an exemplary embodiment of the disclosure, extension arms 310 and 320 are coupled together with an additional pivot 315 to provide the screen with more degrees of freedom. In some embodiments of the disclosure, wall mount system 300 may only have one extension arm (e.g. 320) thus enabling more limited motion.

In an exemplary embodiment of the disclosure, a tilting mechanism 340 may be coupled to the back of mounting interface 110 to enable the screen to tilt up and down relative to the extension arms (310, 320). Optionally, the tilting mechanism 340 is connected with a pivot 325 to extension arm 320 so that the tilting mechanism 340 can swivel relative to extension arm 320.

It should be noted that mounting interface 110 with elongated beams 120 can be attached to other types of wall mount systems, including more stages or less stages, providing tilting, swiveling and/or rotation with more degrees of freedom or less than exemplified by wall mount system 300.

In an exemplary embodiment of the disclosure, wall mount system 300 includes a cable guide 350 for gathering and guiding cables that connect between the screen and other devices, for example speakers, electrical outlets, computers, receivers, converters, video/DVD players and other equipment. Optionally, wall mount system 300 may include a shelf (not shown) for placing such equipment near the screen.

Figure 5:
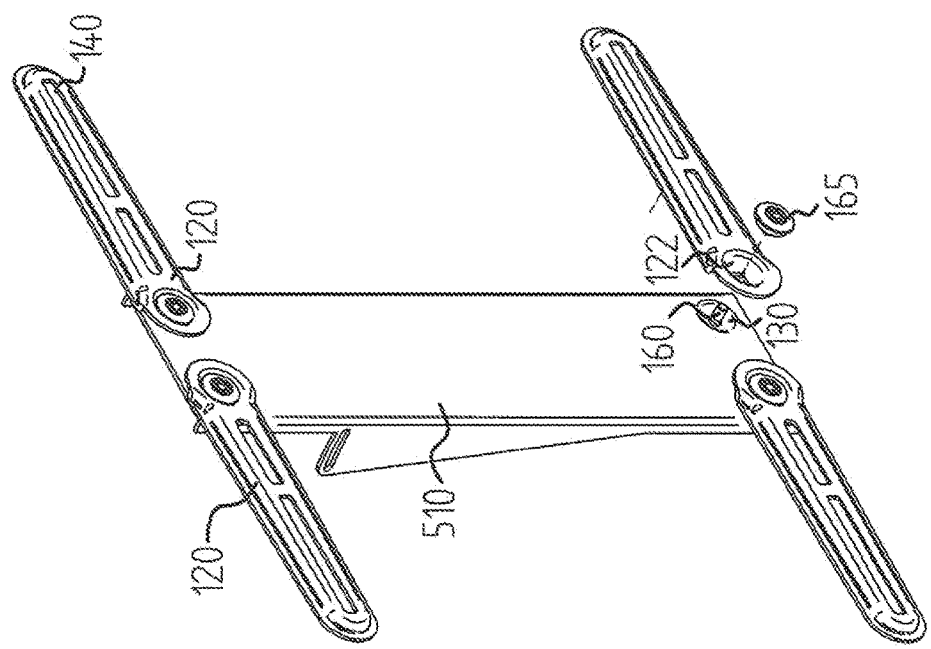
FIG. 5 is a schematic illustration of an alternative mounting interface, according to an exemplary embodiment of the disclosure.

FIG. 5 is a schematic illustration of an alternative mounting interface 510, according to an exemplary embodiment of the disclosure. Mounting interface 510 is functionally the same as mounting interface 110 except that it is shaped as a rectangle instead of the substantially square shape of mounting interface 110.

Figure 6:
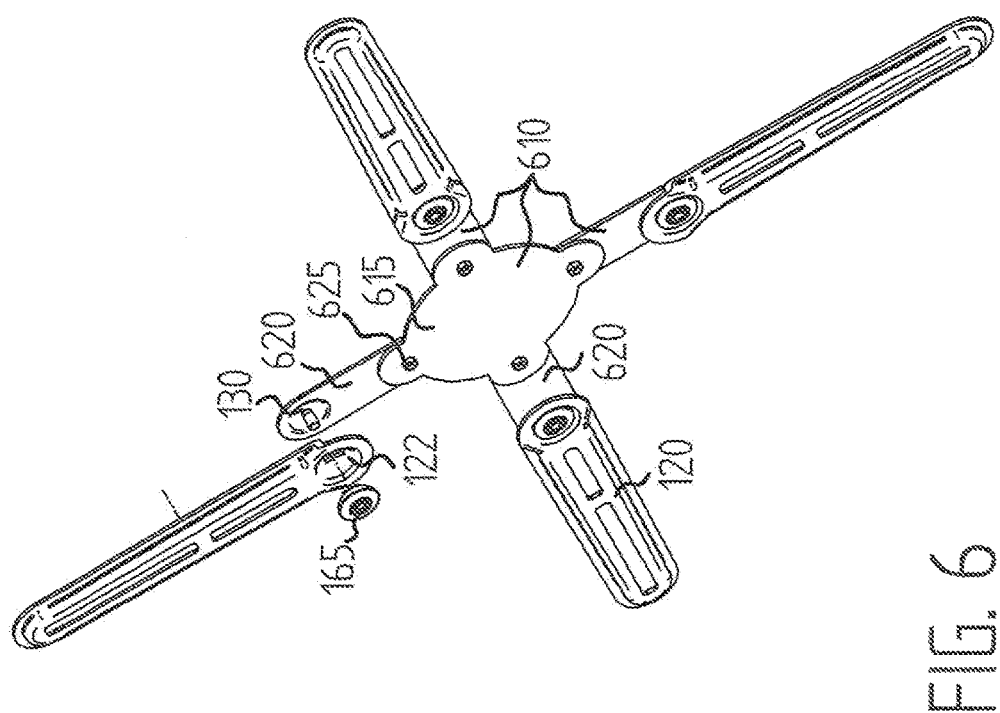
FIG. 6 is a schematic illustration of another alternative mounting interface, according to an exemplary embodiment of the disclosure.

FIG. 6 is a schematic illustration of another alternative mounting interface 610, according to an exemplary embodiment of the disclosure. Mounting interface 610 is similar to mounting interface 110 except that it is made up from two or more pieces, for example a central piece 615 and extension pieces 620 that are connected to central piece 615, for example by screws 625. Optionally, the semi-spherical depressions 130 (as in mounting interface 110) are located on the extension pieces 620. Alternatively they may be located on the central piece 615.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

The invention claimed is:

1. A wall mounting system for connecting a back of a flat or curved screen to a wall, comprising:
 a single piece mounting interface having multiple semi-spherical depressions;
 wherein the mounting interface has a polygonal shape with vertices; wherein each of the multiple semi spherical depressions of the mounting interface is located within the polygonal shape near one of the vertices;
 multiple elongated single pieced beams having matching semi-spherical depressions for adjustably coupling with the multiple semi-spherical depressions of the mounting interface, wherein the semi-spherical depressions of the elongated beams and the multiple semi-spherical depressions of the mounting interface have holes for non-movably coupling between them once adjusted;
 wherein each elongated beam has one or more cut out portions for attaching the elongated beam to the back of the screen.

2. A wall mounting system according to claim 1, wherein the mounting interface is shaped as a square or rectangular.

3. A wall mounting system according to claim 1, wherein the hole in the semi-spherical depression on the elongated beam is larger or smaller than the hole in the semi spherical depression of the mounting interface to enable positioning the elongated beam to fit a curved screen.

4. A wall mounting system according to claim 1, wherein the semi-spherical depression on the elongated beam is coupled to the semi-spherical depression of the mounting interface using a screw and nut.

5. A wall mounting system according to claim 1, wherein the elongated beam is attachable to the screen by inserting a screw through the cut out portion into a screw socket on the back of the screen.

6. A wall mounting system according to claim 1, wherein the mounting interface is attachable to the wall with a tilting mechanism to enable the screen to tilt up and down.

7. A wall mounting system according to claim 1, wherein the mounting interface is attachable to the wall with multiple stages that are pivotally connected.

8. A method of connecting a back of a flat or curved screen to a wall with a mounting system, comprising:
 providing a single piece mounting interface having multiple semi-spherical depressions; wherein the mounting interface has a polygonal shape with vertices; wherein each of the multiple semi spherical depressions of the mounting interface is located within the polygonal shape near one of the vertices;

placing multiple elongated single pieced beams having matching semi-spherical depressions into the semi-spherical depressions of the mounting interface;

adjusting the elongated beam relative to the screen and the mounting interface;

non-movably coupling between the semi-spherical depressions of the elongated beams and the multiple semi-spherical depressions of the mounting interface using holes in the semi-spherical depressions of the elongated beams and holes in the multiple semi-spherical depressions of the mounting interface;

attaching between a cut out portion on each of the elongated beams with the back of the screen; and connecting the mounting interface to the wall.

9. A method according to claim 8, wherein the mounting interface is shaped as a square or rectangular.

10. A method according to claim 8, wherein the hole in the semi-spherical depression on the elongated beam is larger or smaller than the hole in the semi spherical depression of the mounting interface to enable positioning the elongated beam to fit a curved screen.

11. A method according to claim 8, wherein the semi-spherical depression on the elongated beam is coupled to the semi-spherical depression of the mounting interface using a screw and nut.

12. A method according to claim 8, wherein the elongated beam is attached to the screen by inserting a screw through the cut out portion into a screw socket on the back of the screen.

13. A method according to claim 8, wherein the mounting interface is attached to the wall with a tilting mechanism to enable the screen to tilt up and down.

14. A method according to claim 8, wherein the mounting interface is attached to the wall with multiple stages that are pivotally connected.

* * * * *